June 2, 1931.   A. W. DAINOS   1,808,596
GREASING, LIFTING, AND ROCKING MACHINE
Original Filed July 21, 1928   3 Sheets-Sheet 1
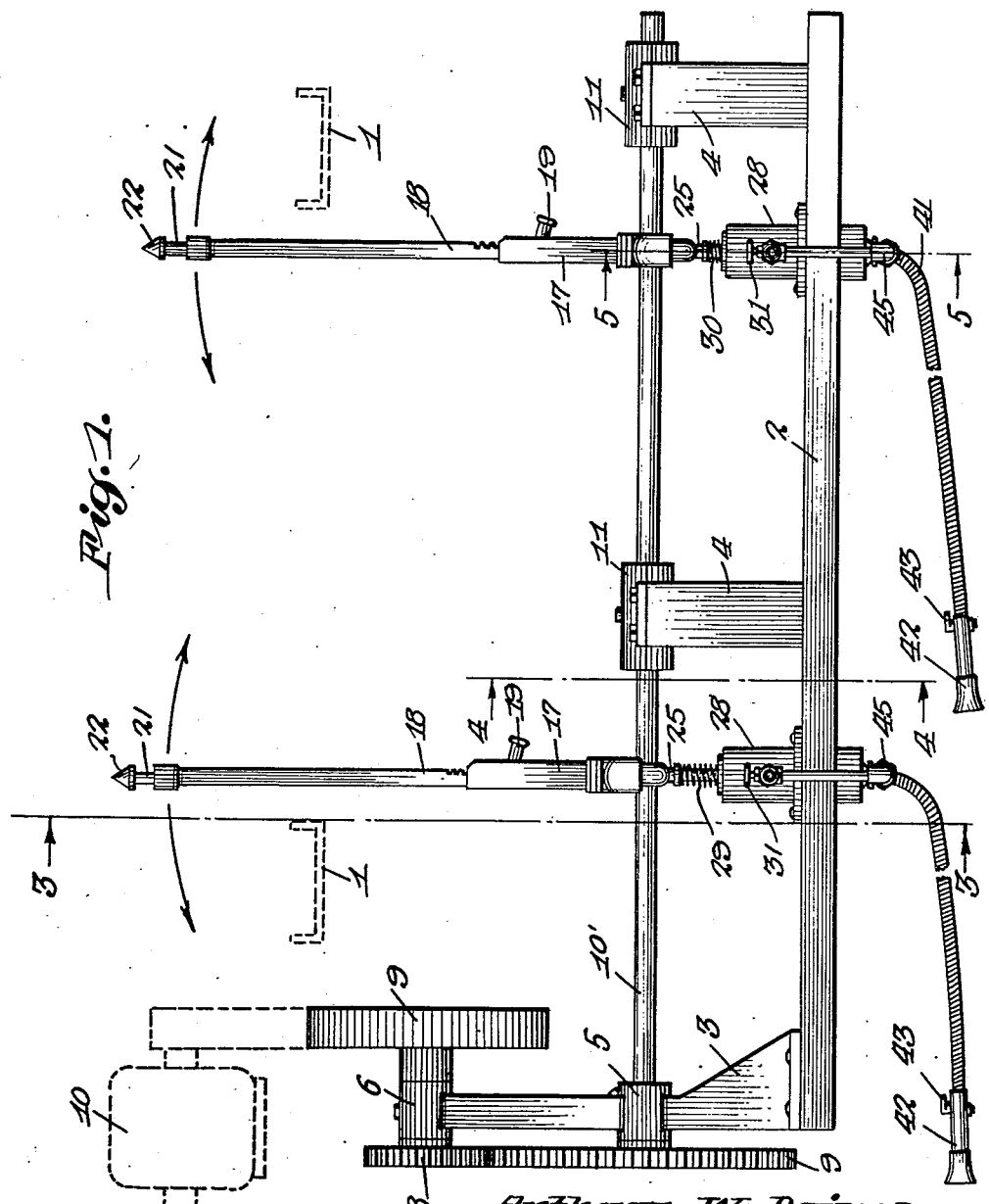
Anthony W. Dainos,
INVENTOR
BY Victor J. Evans
ATTORNEY June 2, 1931.  A. W. DAINOS  1,808,596
GREASING, LIFTING, AND ROCKING MACHINE
Original Filed July 21, 1928  3 Sheets-Sheet 2
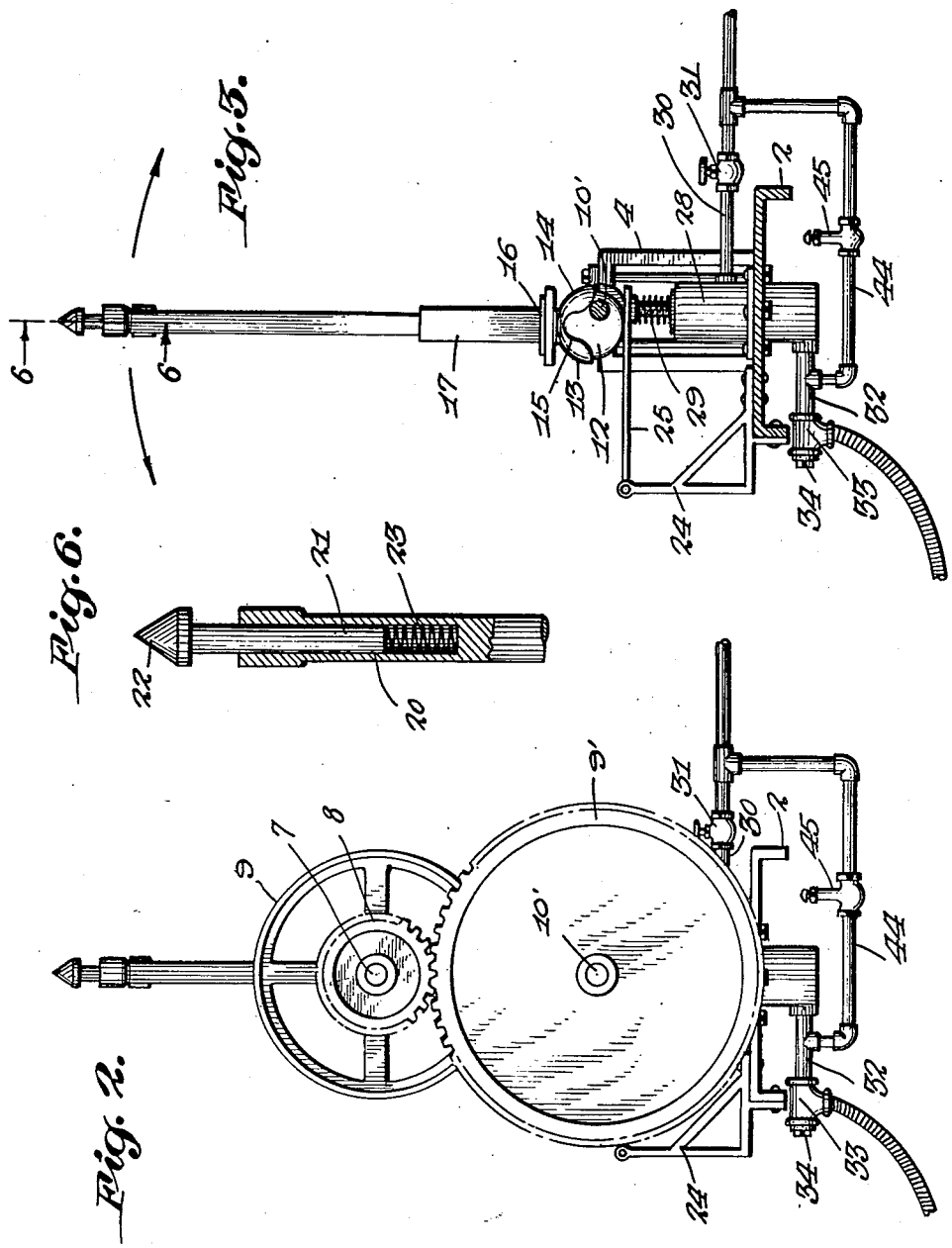
Anthony W. Dainos,
INVENTOR
BY Victor J. Evans
ATTORNEY

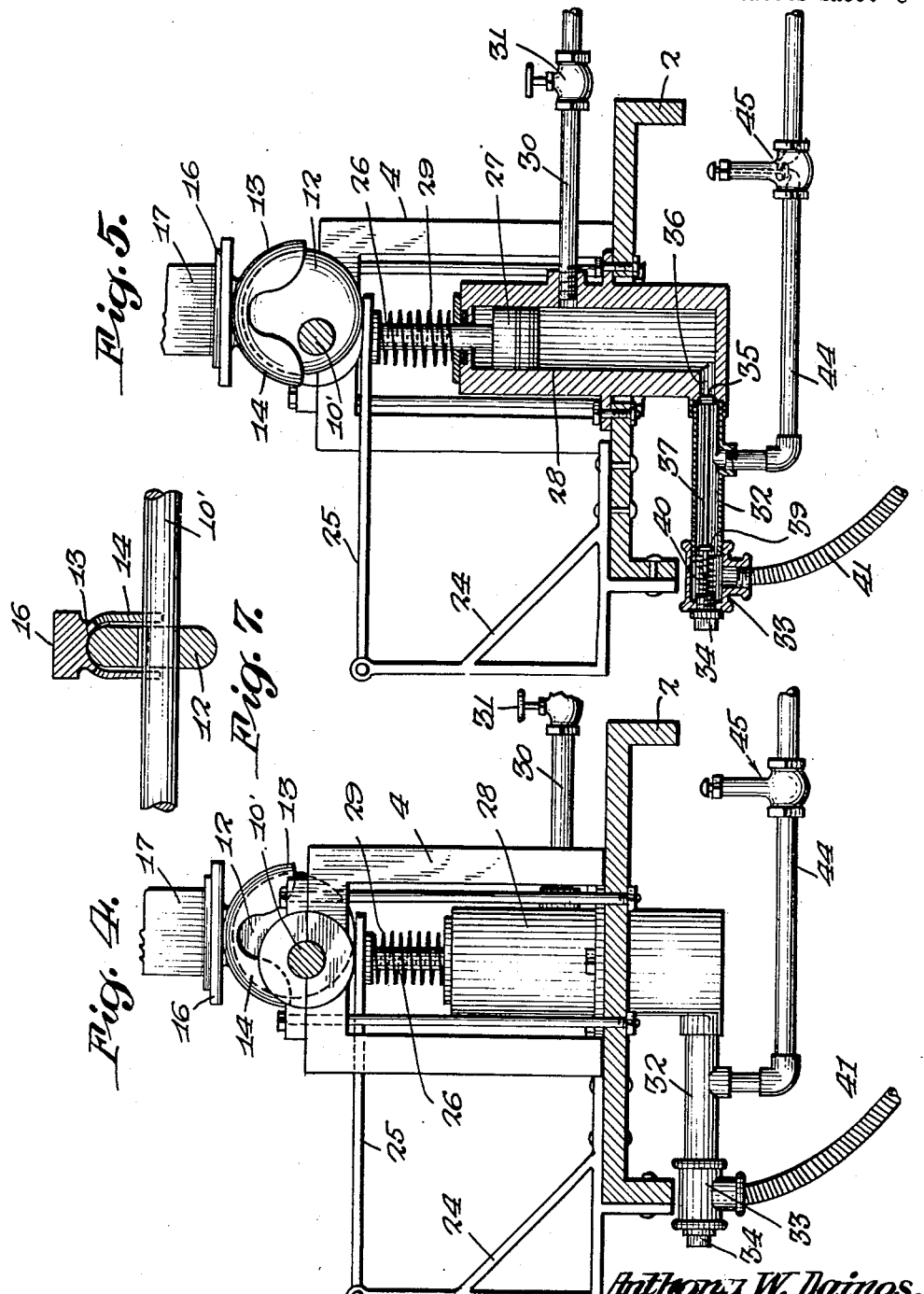

Patented June 2, 1931

1,808,596

UNITED STATES PATENT OFFICE

ANTHONY W. DAINOS, OF NEW ORLEANS, LOUISIANA

GREASING, LIFTING AND ROCKING MACHINE

Application filed July 21, 1928, Serial No. 294,421. Renewed February 18, 1931.

My present invention has reference to a new and novel means for lubricating all of the parts of an automobile.

The primary object of my invention is the provision of means for raising and rocking the bottom of an automobile while oiling and greasing, so that the springs of the machine will alternately open and close to permit of the lubricant to be received between all of the leaves of the springs and further whereby lubricant delivered to other parts of the automobile will be properly directed into such parts and the remote portions thereof, so that all parts of the machine will be quickly and effectively lubricated.

Another object is the provision of a machine for this purpose that is designed to be arranged and permanently fixed to a greasing rack, such as is commonly employed in service stations but which may be likewise installed under any drive or pit in automobile service stations, and which includes means for raising the body of the car just enough to open the spring leaves to permit of the free flow of oil therein and therebetween, to likewise provide means to impart a slow rocking motion to the body of the car vertically in both directions so that the lubricant will be directed to all parts of the car, and the leaves of the springs will be alternately opened and closed so that all parts of the springs will be likewise lubricated, together with pumps for forcing oil and grease under pressure from suitable receptacles through suitable hose having nozzle ends for directing the oil and grease to the parts to be lubricated.

The invention will be fully and comprehensively understood from a consideration of the following detailed description when read in connection with the accompanying drawings which form part of the application, with the understanding, however, that the improvement is capable of extended application and is not confined to the exact showing of the drawings nor to the precise construction described and, therefore, such changes and modifications may be made therefrom as do not affect the spirit of the invention nor exceed the scope thereof as expressed in the appended claims.

In the drawings:

Figure 1 is a side elevation of the improvement.

Figure 2 is an end view thereof.

Figure 3 is a sectional view approximately on the line 3—3 of Figure 1.

Figure 4 is a sectional view approximately on the line 4—4 of Figure 1.

Figure 5 is a sectional view approximately on the line 5—5 of Figure 1.

Figure 6 is a sectional view approximately on the line 6—6 of Figure 3.

In the showing of the drawings, I have arranged at a suitable distance below the channeled or grooved receiving plates 1 of a greasing rack, the base 2 of my improvement. The base may be arranged in a greasing pit at the service station if desired. The base is permanently fixed and is provided at its ends and at its center with upstanding standards. One of the end standards is indicated for distinction by the numeral 3 and the intermediate and second end standard by the numeral 4. The standard 3 is of a greater height than the standard 4 and is approximately intermittently formed with a bearing 5 and with an upper bearing 6. Through the upper bearing 6 there is journaled a shaft 7 that has fixed on its outer end a pinion 8, and on its inner end a belt wheel 9 designed to have trained therearound a suitable belt which is also arranged around and is operated by the shaft of an electric motor 10. The motor is of a comparatively small size and is approximately of one horse power. The motor is, of course, hitched to a suitable source of electricity and the circuit therefor is controlled by a suitable switch, (not shown). The pinion 8 is in mesh with a toothed wheel 9' that is fixedly secured on one end of a shaft 10' that is journaled through the bearing 5 of the standard 3 and that is likewise journaled through bearings 11 carried by the respective standards 4. All of the bearings are provided with oil holes whereby the lubricant may be fed to the shafts 7 and 10'.

The shaft 10' has eccentrically fixed thereon a pair of spaced wheels 12. The periphery of each of these wheels is round in cross section and each wheel is received in the concaved face of what I will term a shoe member. Each of the shoe members is indicated by the numeral 13. Each shoe 13 has side flanges 14 which are notched or cut-away, as at 15, to provide the free passage of the shaft 10' therethrough. The shoes are of heavy castings and have their upper ends flanged, as at 16, and fixed on said flanges or otherwise rigidly secured thereto there are the body sections 17 of jacks. The bodies of the jacks may be of any desired construction, but are, of course, upwardly directed with respect to the base 2, and the racks for the jacks are indicated by the numeral 18. The operating handles for the wheels that engage with the racks 18 are, in the drawings, indicated by the numerals 19. The bars 18, which I have termed the racks are not toothed their entire length, the outer portions of the said bars being round in cross section and having their outer ends provided with sockets 20 in which are received the cross sectionally rounded shanks 21 of members having pointed heads 22. Between the shanks and the lower wall of the sockets there are arranged coil springs 23 which are designed to influence the shanks to arrange the pointed heads of the members 22 a considerable distance outward from the bars 18.

As far as the description has progressed it will be seen that when an automobile is driven onto the rack and the handles 19 operated to bring the pointed elements on the bars 18 into tight engagement with the body or chassis of the automobile, sufficient to open the springs, and the motor 10 is operated, the swinging movement will be imparted to the said bars 18, through the instrumentality of the eccentrically mounted wheels 12 and their engagement with the shoes 13. Thus when a lubricant is delivered between the leaves of the springs of an automobile and into the oil and grease cups therefor, such lubricant, through the reciprocatory vertical motion imparted the automobile, will be directed into every part of the machine to be lubricated, a feature of distinction which cannot be accomplished with any other device of which I have knowledge.

It is also a purpose of this invention to direct oil and grease under pressure to the parts to be lubricated, and to accomplish this I fixedly secured upon the base 2 upstanding frames 24. As disclosed by the drawings, these frames are of substantially L-shaped formation and to the end of the vertical arm of each frame I pivot one end of a plate 25, and each of the plates 25 underlies and is contacted by one of the eccentrically mounted wheels 12 on the shaft 10'. The plates 25 rest on the headed ends of stems 26 of pistons or plungers 27 that are received in suitable casings 28 that are suitably attached to and depend through openings in the base 2.

The stems 26 pass through openings in the top of the cylinders 28, such openings being surrounded by packing boxes and there is arranged on each of the stems 26 a helical spring 29 which exerts a pressure between the top of the said cylinders 28 and the heads of the stems 26, whereby the pistons or plungers 27 will be normally sustained adjacent to the top of the cylinders 28. Each of the cylinders 28 has screwed through one side thereof a lubricant conducting pipe 30. Each pipe 30 has its passage controlled by a hand operated valve 31. Each pipe 30 leads to a source of lubricant supply, one of the pipes leading to a tank for a lubricating oil and the other to a tank for grease.

Each cylinder 28, at its bottom, is provided with an outlet opening from which extends a pipe 32. On the outer ends of each of the pipes 32 there is screwed a T-coupling 33, the outer end of the said coupling being closed by a plug 34. In each of the pipes 32 there is a valve 35 that engages with a flared wall that surrounds the outlet opening 36 in the cylinder 28. Each valve 35 is provided with an elongated stem 37 that may be suitably guided through the pipe 32. Each stem is provided with an enlargement 39 that is contacted by one end of a coiled pressure spring 40 received in the coupling 33 and having its second end contacted by the plug 34. The lateral branch of each of the couplings 33 has attached thereto a flexible hose 41 and the outer end of each hose is provided with a nozzle 42. The passages between the flexible hose or pipes 41 and the nozzles 42 are controlled by hand operated valves 43.

Between the pipe 32 and the lubricant supply tank, (not shown), there is what may be termed a bypass or a return pipe which is broadly indicated by the numeral 44. This pipe 44 has arranged therein an adjustable back pressure or check valve 45 through which an overpressure of lubricant forced through the cylinders 28 and through the hose 41 is returned to the supply tank.

The arrangement, as just described, will, it is thought, materially aid the mechanic in lubricating the automobile as the same delivers the lubricant, whether oil or grease through the nozzles 42, and an over pressure of such lubricant, as stated, will be taken care of by the pipe 44 and the back pressure or check valve 45 therein.

In practice I have found that my machine by delivering road action to an automobile when supported upon the improvement will indicate by noise and squeaks loose bolts and worn or defective parts of an automobile so that such defections can be remedied as the device is positioned upon the machine without an inspection of all of the parts of the machine and further that the rocking motion will loosen frozen shackles and will properly lubricate such shackles to render the same loose in their bearings without the necessity of removal of the shackle bolts, and etc.

Having described the invention, I claim:

1. In a lubricating machine for automobiles, means engageable with the body of an automobile to raise the same to open the leaves of the springs thereof, means for imparting a rocking motion to the automobile when so raised, a lubricant pump and means operated by the rocking means for actuating the pump.

2. In a lubricating machine for automobiles, yieldable means to engage with the body of an automobile, to raise the same to open the leaves of the springs thereof, means for imparting a rocking motion to the automobile when so raised, a lubricant container, a pump associated therewith and means actuated by the rocking means for operating the pump.

3. In a lubricating machine for automobiles, jacks, outwardly extending rack bars therefor, pointed elements on the outer ends of the rack bars to engage with the body of an automobile, and elevating the same when the jacks are operated and means for imparting a swinging motion to the jacks, a receptacle in which a lubricant is delivered, a plunger therein, and means, actuated by the swinging means for the jacks for operating the plunger.

4. In a lubricating machine for automobiles, spaced jacks, rack bars for the jacks, means for raising or lowering the rack bars on the bodies of the jacks, pointed elements having shanks received in the outer end of the rack bars, spring means influencing the pointed elements outwardly, said pointed elements designed to engage with and to elevate an automobile, when the jacks are operated and means for imparting a swinging motion to the jacks, a lubricant receiving receptacle, a plunger therein, and means operated by the swinging means for the jacks for reciprocating the plunger.

5. In a lubricating machine for automobiles, a motor driven shaft, spaced wheels eccentrically fixed on the shaft, hand operated jacks having their base portions provided with hollow shoe members having inner concaved faces to receive the wheels therein and yieldable elements on the outer ends of the jacks designed to engage with the body of an automobile for lifting said automobile when the said jacks are operated, and lubricant pumps operated by the turning of the eccentrically mounted wheels.

6. In a lubricating machine for automobiles, a motor driven shaft, spaced wheels eccentrically fixed on the shaft, hand operated jacks having their base portions provided with hollow shoe members having inner concaved faces to receive the wheels therein and yieldable elements on the outer ends of the jacks designed to engage with the body of the automobile for lifting said automobile when the said jacks are operated, a lubricant receiving cylinder beneath each wheel, a spring influenced plunger having its stem extending through the top of the cylinders, a pivotally secured plate on which each of the wheels rest, and which contact with the plunger stems, a valve controlled inlet and a valve controlled outlet for each of the cylinders and a nozzle carrying hose connected with the outlet.

7. In a lubricating machine for automobiles, a motor driven shaft, spaced wheels eccentrically fixed on the shaft, hand operated jacks having their base portions provided with hollow shoe members having inner concaved faces to receive the wheels therein and yieldable elements on the outer ends of the jacks designed to engage with the body of an automobile for lifting said automobile when the said jacks are operated, a lubricant receiving cylinder beneath each wheel, a spring influenced plunger having its stem extending through the top of the cylinders, a pivotally secured plate on which each of the wheels rest, and which contact with the plunger stems, a valve controlled pipe leading from a source of lubricant supply communicating with each of the cylinders, a pipe member providing an outlet at the lower end of each cylinder, a spring influenced valve for normally closing the outlet, a nozzle carrying hose connected with the outlet, a pipe connected with the last mentioned pipe and with the source of lubricant supply, and a hand operated check valve controlling the passage through said pipe.

In testimony whereof I affix my signature.

ANTHONY W. DAINOS.